3,752,663
CONTINUOUS PRODUCTION OF LIQUID STEEL USING ARC FURNACES

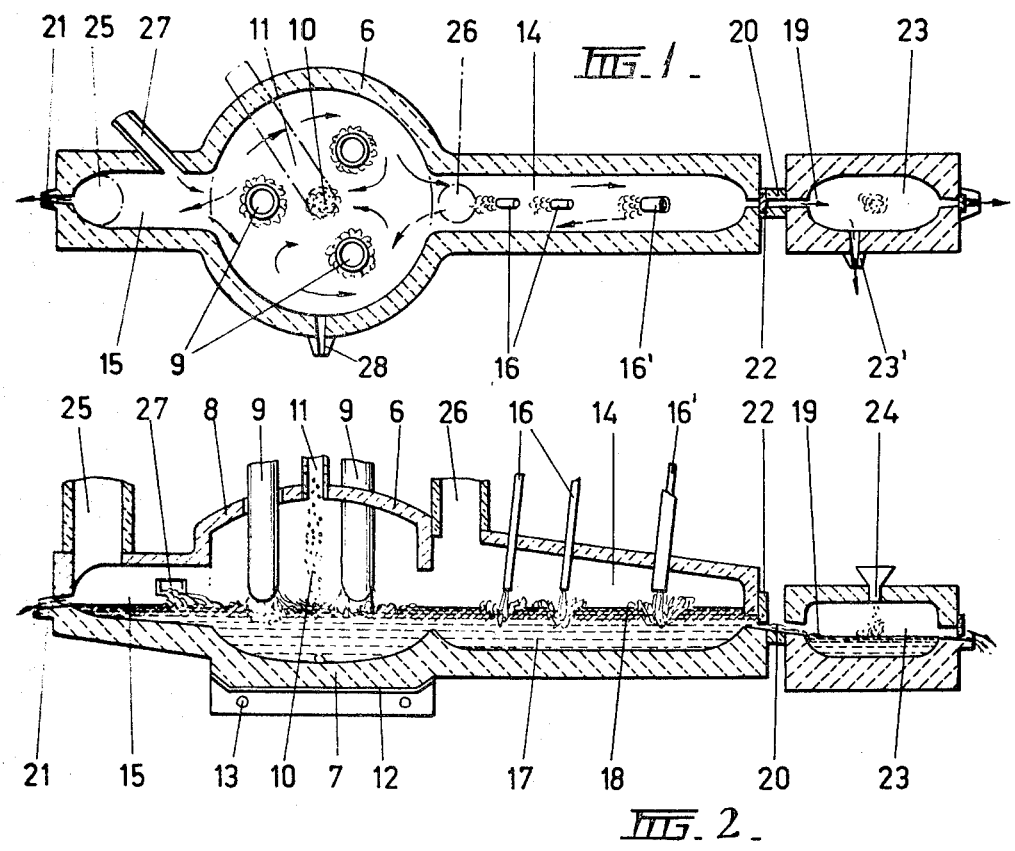
FIG. 1.
FIG. 2.
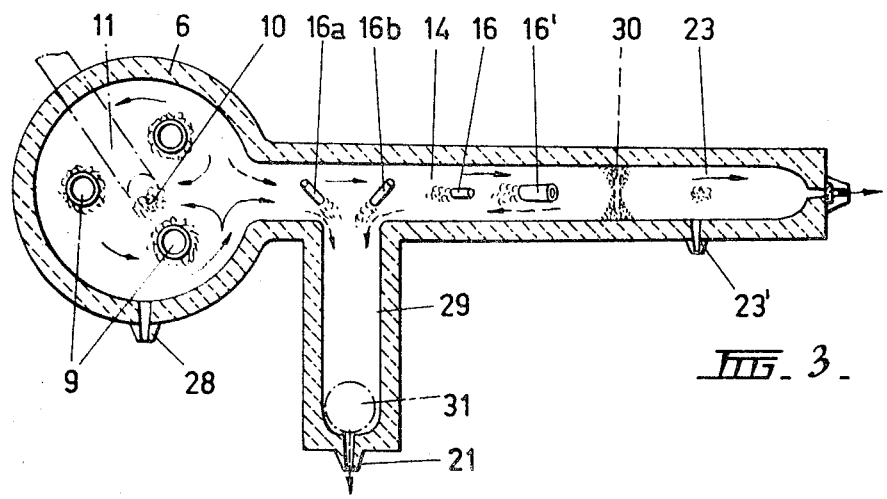
FIG. 3.

Howard Knox Worner, North Balwyn, Victoria, and Ronald Siddons, Cardiff Heights, Newcastle, New South Wales, Australia, assignors to Conzinc Riotinto of Australia Limited, Melbourne, Victoria, Australia
Continuation of abandoned application Ser. No. 684,814, Nov. 21, 1967. This application Sept. 23, 1970, Ser. No. 74,834
Claims priority, application Australia, Nov. 28, 1966, 14,483/66
Int. Cl. C21c 5/52; H05b 7/18
U.S. Cl. 75—12                        16 Claims

ABSTRACT OF THE DISCLOSURE

A continuous smelting-refining process comprising feeding pre-heated and pre-reduced oxidic ores in agglomerated or particulate form into an electric furnace, the smelting and refining being effected substantially in a horizontal plane in a single integrated arc furnace having an arc melting-smelting zone, an elongated refining zone, and a slag separation zone, the said zones being separate but in communication; feeding the oxidic ores continuously into the melting-smelting zone; maintaining the molten material in the melting-smelting zone in a state of turbulence; effecting electrical induction stirring of the molten material in the melting-smelting zone in order to maintain said material in a state of circulation, flowing unrefined metal from the melting-smelting zone to the refining zone, subjecting the unrefined metal in the refining zone to lancing with oxygen-containing gas, flowing the slag countercurrent to the flow of metal in at least a part of the refining zone and then flowing said slag into the slag separation zone, maintaining relatively quiescent conditions in the slag separation zone withdrawing refined metal from the refining zone, and withdrawing slag from the slag separation zone. Optionally, the slag may be caused to flow concurrent to the flow of metal in one refining zone and to flow countercurrent to the flow of metal in another refining zone, and then flow from said refining zones into the slag separation zone or zones.

---

Figure 4:
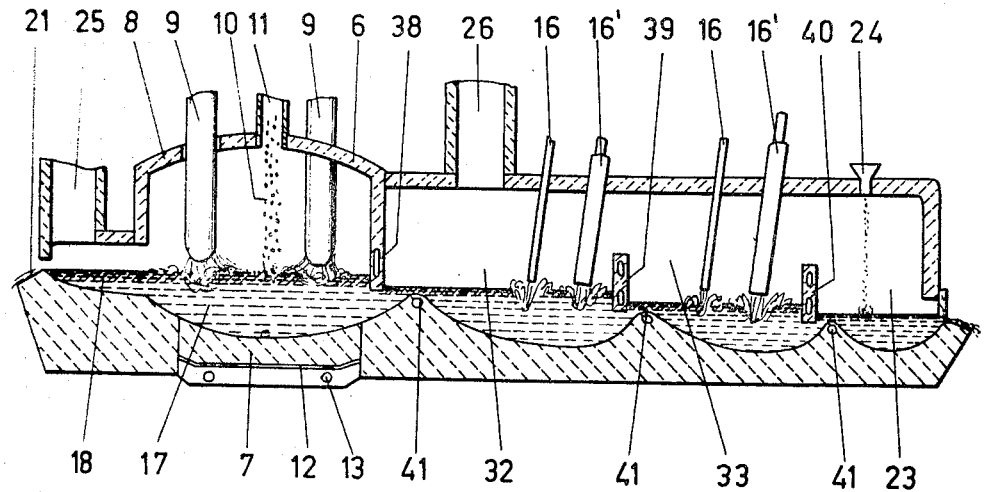

This application is a continuation of abandoned application Ser. No. 684,814, filed Nov. 21, 1967.

This invention relates to the continuous production of liquid steel of composition and temperature suitable for continuous casting into solid shapes.

The invention makes possible the production of steel without the necessity of using high capital cost blast furnaces with their associated coke making and sinter or oxide pellet plants. The invention is of particular interest and of greater economic attractiveness in areas where electric power is relatively cheap. Capital cost of the processing units is considerably less than that of conventional iron and steel making plants of comparable capacity and if electric power is available at less than (say) one cent per unit the processing costs are also significantly less.

Accordingly, in one general form the invention provides a continuous smelting-refining process in which pre-heated and pre-reduced oxidic ores in agglomerated or particulate form are continuously fed into the arc zone of an electric furnace, characterized in that smelting and refining are effected in separate but interconnected melting-smelting, refining and slag settling zones in a single furnace.

Preferably, turbulence and circulation are produced and maintained in the bath in the melting-smelting zone and the molten metal flows continuously from the melting-smelting zone into the refining zone.

In a preferred form the invention provides a continuous process of melting and smelting iron ore in a furnace comprising an arc melting-smelting vessel having an arc zone, a refining zone integral with or connected to the arc smelting vessel, and one or more slag separation zones integral with or connected to the arc melting-smelting vessel characterized by feeding pre-reduced iron ore in agglomerated or particulate form at a temperature between 400° C. and 1250° C., preferably 850° to 1100° C. into the arc zone of the electric furnace to produce a semi-steel with between 0.5 and 4% carbon and not more than 1% silicon, continuously stirring and circulating the metal in the vessel, continuously refining this metal to steel by the injection of an oxygen-containing gas and basic fluxes thereinto as it flows through the refining branch, causing slag to flow countercurrently to the metal for at least part of the length of the refining branch, maintaining relative quiescence in the slag separation zone or zones, and tapping slag from one or more tapholes after passing through a corresponding number of slag separation zones.

The invention in another preferred form provides suitable apparatus for carrying out the above method and in which hot pre-reduced iron rich agglomerates are continuously fed via a chute or other suitable means to the arc zone of an electric furnace with an integral or connected elongated refining zone in which semi-steel produced in the arc smelting vessel is continuously refined to steel by the combined action of jetting of oxygen-containing gases and the addition of basic fluxes. The refined steel may then be continuously deoxidised or otherwise prepared for continuous casting either in an extension of the refining branch or in a separate vessel by the continuous addition to the flowing metal or appropriate additives.

The invention differs from established steel-making processes not only in respect of the process and apparatus employed, but also in that the source of metallics to the process consists of pre-reduced iron ore pellets or pre-reduced lump iron ore both in a hot condition and being used either directly for the pre-reduction plant or after a reheating operation and having a temperature in the range 400° to 1250° C., preferably between 850° and 1100° C. The elevated temperature of the metallic feed results in considerable economies of electric power.

Due to the feed location, the continuity of feeding and the preheated nature of the feed material, smelting is extremely rapid. Circulation of the metallic material in the continuous electric smelting furnace may be achieved by electric induction stirring coils situated beneath the vessel or by other means. It is desirable to achieve substantial homogeneity in the liquid metal leaving the melting-smelting vessel.

It has been found beneficial for the pre-reduced iron ore agglomerates to contain residual carbon to the extent of 2.5 percent to 6 percent; this residual carbon content assists in the smelting reactions, it reduces the thermal and power requirements of the process and also helps to maintain the optimal level of carbon in the bath for the sulphur-removing stage of refining. If the pre-reduced lump ore or agglomerates do not themselves contain carbon in the required amount, additional carbon in the form of small lumps of char, coal, coke or graphite may be added with the ferruginous feed.

A preferred composition of the hot metal or semi-steel in the smelting vessel in between 1.5 and 2.5 percent carbon and between 0.1 and 0.5 percent silicon but in particular circumstances other compositions may be maintained.

One means of assisting in maintaining appropriate carbon and silicon levels in the arc melting-smelting vessel is to admit to the vessel either directly or via a slag separation chamber connected thereto, a steady stream of molten pig iron such as can conveniently be produced by employing a hot blast cupola for melting in-plant scrap. Such metal normally contains 3 to 4.5 percent carbon and 1 to 2 percent silicon.

The preferred temperature for the metal in the arc melting-smelting vessel is within the range 1420° and 1500° C. but temperatures outside this range may be employed to suit particular operating objectives.

The flow of the metal from the arc melting-smelting vessel into the refining chamber or branch is achieved by gravity, and the rate of flow is a function of the feed rate of pre-reduced material and the melting rate which in turn is related to the power input to the vessel; these are readily controlled.

Slag is removed continuously from the furnace via one or more slag separation chambers which connect with the furnace proper and are preferably constructed with a hearth sloping back, from near a lip type taphole in each chamber, to the furnace proper. By this means metal shot which settles out from the slowly moving slag in the relatively quiescent slag separation chamber or chambers may flow back under gravity to rejoin the main metal stream. This is one feature of the invention which contributes to reduced iron losses in slag.

Another feature of the invention which assists in reducing iron losses in slag is the practice of countercurrent flow of slag relative to metal in the refining branch. When slag is caused to flow back over hot metal containing 1.5 percent or more of carbon and a little silicon it is denuded of some of its dissolved iron by a reaction of the type:

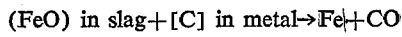
(FeO) in slag + [C] in metal → Fe + CO

In one form of the invention the slag may be caused to flow countercurrent to metal for not only the greater part of the length of the elongated refining branch but right through the arc melting-smelting vessel itself and be tapped finally from a slag separation zone or chamber more or less opposite to the refining branch.

The reduction of the FeO content of the slag can be still further enhanced if molten pig iron is fed into the arc melting-smelting vessel via a slag separation chamber connected thereto and is flowed generally countercurrent to the outflowing slag. The reaction quoted above represents the type of reaction which will occur between carbon in the inflowing pig iron and FeO in the outgoing slag. In addition some of the silicon in the molten pig iron will react according to the equation:

[Si] in pig iron + 2FeO in slag → 2Fe + SiO$_2$

The silica formed will immediately enter the slag phase.

With respect to the refining branch, control of slag composition is necessary for optimisation of the refining conditions. The removal of both sulphur and phosphorus is enhanced by the use of highly basic slags but, whereas sulphur is best removed when the carbon content of the metal is relatively high and the oxygen activity in both metal and slag is low, phosphorus transfer to slag takes place much more readily when the oxygen activity in both metal and slag is relatively high.

The countercurrent slag practice provides favourable conditions for effective removal of sulphur and phosphorus, from the progressively (or sequentially) oxygen-lanced metal stream.

The countercurrent slag being continuously generated by jetting in of lime (and possibly other fluxes like fluorspar), at or near to the metal outflow end, is at that stage both highly basic and highly oxidised (virtually a liquid calcium ferrite). It is not permitted to escape with the metal so must flow countercurrent to the steel and in so doing carries with it the phosphorus and sulphur it is continuously and progressively extracting from the metal.

In one form of the invention countercurrent flow of slag relative to metal is achieved for the full length of the refining branch and the slag flows into and through the arc melting-smelting vessel to be tapped finally from a slag separation chamber more or less opposite to the refining branch.

In another form of the invention, two separate slags are generated in the refining branch with a slag baffle dividing the two zones. Conditions in the first zone, extending over the region where the carbon content of the metal is still relatively high (e.g. above 1 percent C) and the oxygen activity low, are favourable to the removal of silicon and sulphur. Conditions in the second zone, extending over the region where the oxygen activity in both metal and slag are increasing, are favourable to phosphorus and further sulphur removal, particularly if the slag is flowing countercurrent to metal in that zone. In this form of the invention there will be at least two slag removal points in the refining branch and there may be a third from the arc melting-smelting vessel itself.

In yet another form of the invention two distinctive refining zones are developed within the refining branch but preferably with only one slag offtake via a single slag separation chamber. This form makes use of one of the methods and apparatus covered in our Australian Pat. No. 404,433 and in our British Pat. No. 1,143,526 for continuous refining of molten pig iron. In the first zone where desiliconising and desulphurising predominate, the slag flows generally concurrently with the semi-steel while in the second refining zone where decarburising and dephosphorising dominate, the slag flows countercurrent to the metal.

In all of the forms of the invention the refining with respect to silicon and sulphur, carbon and phosphorus is preferably followed by continuous deoxidation and temperature adjustment prior to feeding to the tundish of a continuous casting plant. This is conveniently achieved in either an extension of the refining branch or in a separate chamber or vessel. The additives in this last chamber can be materials such as finely crushed ferro-silicon or ferro-manganese and aluminium shot—all for deoxidation purposes, or can be minor alloying additions.

If the temperature of the deoxidised steel is too high, coolants in the form of scrap in small pieces, or fully metallised pellets, or reduced ore in the form of lumps or fines of low gangue content may be added by gravity or injected into the metal bath. In the event that reduced ore or pellets are used as coolant small additional quantities of lime and/or dolomite will usually be required to flux the gangue content and in this case provision should be made for tapping the relatively small quantity of slag either intermittently or continuously depending on the amount of slag generated. As the sulphur and phosphorus refining has already been achieved it will usually not be necessary to use highly basic slags in the deoxidising and temperature-adjusting chamber. Refractories appropriate to the slag produced can be employed. The temperature of the liquid steel leaving this final deoxidation temperature-adjusting stage is continuously measured and used to control the rate of addition of coolant.

The liquid metal now of correct composition and temperature flows out of the furnace via an appropriate weir-dam system and flows either to a tilting holding vessel or directly to the receiving tundish of the continuous casting system in which the steel is continuously converted into solid shapes.

The invention will be better understood by reference to the drawings of FIGS. 1, 2, 3, 4 and 5 which show diagrammatically some of the possible embodiments of the invention.

FIGS. 1 and 2 show diagrammatically in section plan and elevation views, respectively, a form of the invention in which wholly countercurrent slag flow relative to metal is effected and the one main slag offtake is via a slag separation chamber opposite to the refining branch.

The furnace consists of an arc melting-smelting vessel of generally circular shape 6, with a refractory bottom 7, a refractory roof 8. The electrodes 9 enter the furnace through the roof as in conventional arc furnaces. The hot ferruginous feed 10 enters the furnace in the vicinity of the arc zone as for example, in the centre of the roof at 11, alternatively the feed material may enter through the roof close to the electrodes, generally between the electrodes and the furnace walls. At the base of the arc zone, and separated by an austenitic stainless steel plate 12 are very low frequency induction stirrers 13 of the type developed by the Swedish firm A.S.E.A. Ltd. The elongated extension 14 represents the refining branch, while extension 15 represents the slag separation chamber. Lances 16 jet an oxygen-containing gas into the refining zone and are preferably angled so as to assist the countercurrent flow of slag 18 relative to metal 17. Along with the oxygen-containing gas injected via lance 16', basic fluxing materials, for example powdered lime, fluorspar, are also introduced. These are stirred into the slag or metal by the vigorous turbulence generated by lancing.

Refined steel 19 is tapped from the furnace via taphole 20 and slag is tapped from the other end of the furnace via taphole 21. A slag bridge 22 at the end of the refining branch 14 prevents the outflow of slag with the refined steel. The steel may flow into a separate deoxidation chamber 23 where appropriate deoxidants may be added through a hopper-port 24. Any small amount of slag formed as a result of deoxidation may be tapped from an auxiliary taphole 23'. The deoxidation chamber 23 may alternatively be in the form of a degassing apparatus such as covered by our U.S. Pats. Nos. 3,321,300 (issued May 23, 1967) and 3,572,671 (issued Apr. 19, 1971) and British Pat. No. 1,192,856.

In FIGS. 1 and 2, two gas offtakes 25 26 are shown; the former at the end of the slag separation chamber 15, the latter at the end of the refiner branch 14 adjacent to the melting-smelting vessel.

In-plant scrap may be added to the furnace in two forms:

(a) As comminuted, for example, shredded, material through ports at appropriate wall positions to reduce refractory erosion, or, (b) As a stream of molten pig iron or semi-steel fed by a launder 27 as for example, near the junction of the slag separation chamber and the arc melting-smelting vessel and in such a direction as to assist the flow pattern in the metal bath.

The preferred slopes and depths of the furnace hearths are as shown in the vertical cross-section FIG. 2 with the hearth in the slag separation chamber 15 sloping generally backwards from the level of the taphole 21 so as to carry into the melting-smelting vessel any metal which settles in the slag separation chamber 15. It is desirable to have an auxiliary metal tapping outlet for the drainage of the furnace at the end of a campaign and this can be located at any convenient position, for example 28.

FIG. 3 shows diagrammatically in sectional plan view a form of the invention in which there is both concurrent and countercurrent slag flow relative to metal in the refining branch.

In this particular embodiment of the invention the slag separation chamber 29 is connected to the main rebning chamber 14 near to its point of junction with the melting-smelting vessel. Lance 16a is so angled as to generally assist the flow of slag concurrent with respect to metal and lance 16b to assist the flow of slag moving countercurrent to metal. Both jets move the slag in the general direction of the slag separation chamber. The deoxidation chamber 23 is integral with the refining chamber 14. Slag is prevented from flowing with the steel from the refining chamber 14 into the deoxidation chamber 23 by a fluid cooled slag bridge 30. Only one gas offtake 31 located at or near the slag separation chamber is provided.

Figure 5:
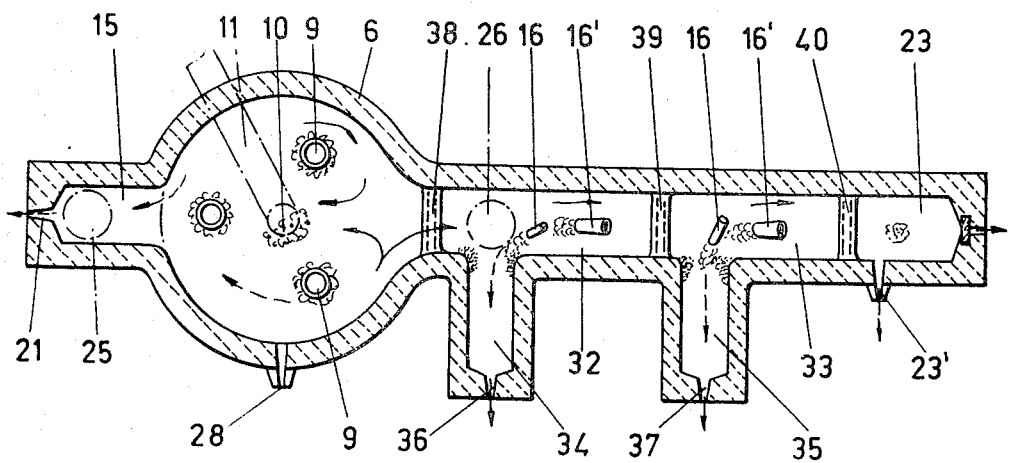

FIGS. 4 and 5 show diagrammatically in elevation and plan view respectively, a further form of the invention in which there are two zones in the refining branch, 32 and 33 respectively, each with countercurrent slag flow and each with a slag separation branch, 34 and 35 respectively, and slag tapholes 36 and 37 respectively, therefrom. Fluid cooled baffles 38, 39 and 40 and fluid cooled bridges 41 are provided to divide the various zones.

EXAMPLE

The considerable metallurgical potential of this invention was demonstrated in a series of trials in a small pilot plant at Cockle Creek, New South Wales, Australia, utilising a furnace which incorporated the general features shown diagrammatically in FIG. 3. The slag settling branch 29 connected with the refining branch 14 near to the junction of the latter with the arc melting-smelting chamber or zone 6.

As pointed out earlier, this particular embodiment of the invention involves a concurrent flow of slag with semi-steel from the melting-smelting chamber to the end of the slag settling branch and a countercurrent flow of slag relative to steel in the refining branch proper. The two slags join and mix at the entry to the slag settling branch and flow as one slag out from the exit end of this branch.

The melting-smelting zone and refining branch of the furnace were lined with high quality MgO bricks and the slag settling branch was lined with basic ramming material also rich in MgO.

To reduce erosion of the basic bricks in long continuous melting-refining campaigns, an air cooled channel was incorporated in the furnace shell at the slag line for the full distance around both the melting-smelting chamber and the refining branch. Slag erosion in the melting-smelting chamber was also minimised by periodic charging of cold shredded steel scrap, with a mixture of lump char and ferro-silicon added, around the walls, and particularly at regions where the heat "flare" from the arcs was greatest.

The principal feed to the melting-smelting zone was white hot metallised pellets, produced in a rotary kiln refractory chute 11 through a central opening right into (not shown in the diagrams), and allowed to fall via a the hot arc zone of the furnace. The pellets were fed as hot as possible and usually in the temperature range of 1,000° C., thus saving much electrical energy which would otherwise have been needed to transfer the equivalent amount of heat from the arcs. The savings in power was of the order of 20%.

A variety of metallised pellets have been used, most of them were derived from two rich feed sources whose average compositions are as follows:

|  | Hamersley hematite fines | Palabora magnetite concentrates |
| --- | --- | --- |
| Total Fe, percent | 67.5 | 67.2 |
| Mn, percent | Trace | 0.15 |
| SiO₂, percent | 2.1 | 0.3 |
| Al₂O₃, percent | 1.0 | 0.7 |
| TiO₂, percent | Trace | 0.6 |
| Combined H₂O, percent | 0.3 | Trace |
| S, percent | 0.02 | 0.03 |
| P, percent | 0.03 | 0.02 |
| CaO, percent | Trace | 1.0 |
| MgO, percent | Trace | 2.3 |
| Unidentified materials | Balance | |

Most of the pellets were made from an ore-char-CaO blend in the ratio 79:17:4. The composite damp pellets were allowed to carbonate in air and dry over a period of at least 30 hours before charging to the metallising kiln.

The char used was prepared from low ash, low sulphur content brown coal from Yallourn, Victoria and had an average composition (dry basis) as follows:

Percent
Fixed carbon _____ 94.2
Volatiles _____ 1.0
Ash _____ 4.1
Sulphur _____ 0.3
Not determined _____ 0.4

Typical ranges of analyses for metallised pellets produced from the two ore sources were as follows:

|  | Hamersley pellets | Palabora pellets |
|---|---|---|
| Total Fe, percent | 82-88.5 | 80.5-88.0 |
| Metallic Fe, percent | 75-83 | 73-82.5 |
| Carbon, percent | 3.5-4.1 | 3.2-4.5 |
| Sulphur, percent | 0.04-0.06 | 0.05-0.07 |
| Phosphorus, percent | 0.02-0.04 | 0.02-0.03 |
| Other (oxygen plus gangue plus lime) | 12-7.0 | 13.2-6.8 |
| Base/acid ratio | ca. 1.0 | ca. 1.5 |

As the small furnace used was not fitted with induction stirrers, bath circulation in the melting-smelting zone was achieved by tangential jetting of a dense coal-air or char-air mixture via two fluid cooled lances submerged to just below the slag-metal level near the periphery of the circular chamber.

The injection served not only to maintain bath circulation in a horizontal plane but assisted in maintaining the carbon level in the metal in the melting chamber within the semi-steel range. Typical ranges of analyses of the semi-steel in the melting-smelting chamber were as follows:

| | Percent |
|---|---|
| C | 2.3-2.6 |
| Si | 0.3-0.5 |
| Mn | 0.02-0.1 |
| Ti | Trace-0.03 |
| S | 0.04-0.06 |
| P | 0.03-0.06 |
| Fe | Balance |

The temperature of the bath in the melting-smelting chamber was maintained as far as possible within the range 1,475°-1,510° C. and a continuous gentle boil took place as a result of the reaction between the carbon in the bath and the FeO residual in the ingoing hot pellets and also in the slag.

The reaction can be represented by the equation—

$$(FeO) + [C] \rightarrow Fe + CO$$

The semi-steel flowed continuously from the melting-smelting chamber into the refining branch where it was sequentially refined with oxygen to steel, the $O_2$ being jetted into the slowly flowing metal stream by 4 to 6 lances—the larger number being used when very low carbon steels were being produced. The lances were angled at approximately 60° to the horizontal and in such a manner as to assist the countercurrent flow of refining slag relative to metal.

The refining slag was generated by injection of a mixture of 90% soft burnt lime and 10% fluorspar through an auxiliary calorised steel pipe close to the last oxygen lance. The slag had almost infinite basicity at the point where it was generated and so had very high capacity for refining with respect to both sulphur and phosphorus. As the slag flowed countercurrent to the metal it progressively picked up these elements and later silica also, finally joining with the concurrent slag and flowing into the slag settling branch. There was no possibility of reversions of S and P from the hot slag to hot steel as is common in other methods proposed for continuous steelmaking.

The aim in most of the runs was to produce a final slag in which the $$\frac{CaO+MgO}{SiO_2+Al_2O_3}$$

ratio was between 2 and 2.5 but as already pointed out, the slag basicity in the refining branch for the greater part of its length was many times higher and approached infinity towards the point of lime injection.

Iron losses in slags were low; total Fe values in slags (which averaged between 10 and 12% of the weight of steel produced) ranged between 3 and 7%. The FeO values could be brought to quite low values, approaching those in blast furnace slag by injecting char or low volatile coal into the slag early in its passage through the slag conditioning and settling branch. The iron shot formed by the reaction $$(FeO) \text{ in slag} + C \rightarrow Fe + CO$$

settled to the bottom and gravitated back down the (backward) sloping hearth of the slag settling branch into the main stream of metal in the refining branch.

By the method outlined and depending on the amount of oxygen injected into the metal flowing through the refining branch, steels of any desired carbon content could be produced. The other impurity elements including sulphur and phosphorus were very low. A typical analysis for a low carbon steel was:

| | Percent |
|---|---|
| C | 0.11 |
| Si | 0.01 |
| Mn | 0.01 |
| Ti | [1] Trace |
| S | 0.012 |
| P | 0.004 |

[1] Even in steels made from Ti bearing Palabora pellets.

The low carbon steels particularly needed deoxidation and degassing in a separate chamber 23 before casting. In a commercial operation this would be achieved by additions of commercial deoxidising alloys or other appropriate treatments such as continuous vacuum treatment which is the subject of other patent applications made by us.

We claim:

1. A continuous smelting-refining process comprising establishing and maintaining a bath of molten metal and slag in a single integrated furnace having an arc melting-smelting zone, an elongated refining zone, and a slag separation zone, the said zones being separated but in communication;
causing preheated and prereduced ore in agglomerated or particulate form continuously freely to fall into the bath in the central region of the arc zone of the furnace where the molten material is maintained in a state of turbulence;
effecting electrical induction stirring of the molten material in the melting-smelting zone in order to maintain said material in a state of circulation,
flowing unrefined metal from the melting-smelting zone to the refining zone,
subjecting the unrefined metal in the refining zone to lancing with oxygen-containing gas,
flowing the slag countercurrent to the flow of metal in at least a part of the refining zone and then flowing said slag into the slag separation zone,
maintaining relatively quiescent conditions in the slag separation zone,
withdrawing refined metal from the refining zone, and withdrawing slag from the slag separation zone.

2. A process according to claim 1, wherein slag flows concurrent to the flow of metal in one part of the refining zone and flows countercurrent to the flow of metal in another part of said refining zone, and then flows from said refining zone into the slag separation zone.

3. A process according to claim 1, wherein unrefined metal flows into the refining zone at one end and refined metal is withdrawn from the opposite end of said refining zone.

4. A process according to claim 1, wherein slag flows into the slag separation zone at one end and is withdrawn from the opposite end of said slag separation zone.

5. A process according to claim 1, in which the prereduced iron ore in agglomerated or particulate form is fed into the melting-smelting zone of the furnace at a temperature between 400° C. and 1250° C. to produce a molten metal product containing between 0.5% and 4% carbon, and in which said product is continuously refined to steel by injecting basic fluxes along with the oxygen-containing gas thereinto as it flows through the refining zone and tapping steel from the end of the refining zone.

6. A process according to claim 5, wherein the prereduced iron ore is at a temperature between 850° C. and 1100° C., and the molten metal product contains between 1.5% and 2.5% carbon.

7. A process according to claim 5, in which prereduced iron ore agglomerates containing 2.5% to 6% residual carbon are employed as feed material.

8. A process according to claim 5, in which the molten metal product contains between 0.1% and 0.5% silicon.

9. A process according to claim 5, in which a stream of molten pig iron is admitted to the melting-smelting zone.

10. A process according to claim 5, in which the temperature of the metal in the melting-smelting zone is within the range 1420° C. to 1500° C.

11. A process according to claim 1, in which slag flows countercurrent to metal for the full length of the refining zone into and through the melting-smelting zone and is tapped from a slag separation zone substantially opposite to the refining zone.

12. A process according to claim 5, in which two distinct refining zones are employed, silicon and much of the sulfur and some phosphorus being removed in the first refining zone in which the slag flows generally concurrently with said molten metal product, while in the second refining zone, where decarburizing and dephosphorizing predominate, the slag flows countercurrent to the metal.

13. Apparatus for the continuous smelting and refining of oxidic ores in an electric furnace, which comprises an arc melting-smelting zone, an elongated refining zone, and a slag separation zone,
said zones being substantially in the same horizontal plane and being separate but in communication;
electrodes entering the melting-smelting zone;
electrical induction stirring means for imparting circulation to the molten material in the melting-smelting zone;
lances for injecting oxygen-containing gas into the molten material in the refining zone;
means for causing slag to flow countercurrent to the metal in at least a part of the refining zone and for causing said slag to flow into the slag separation zone;
a metal outlet in the refining zone for withdrawing refined metal; and
a slag outlet in the slag separation zone for the withdrawal of slag.

14. Apparatus according to claim 13, wherein said induction stirring means is located externally of the furnace chamber.

15. Apparatus according to claim 13, wherein the melting-smelting zone is substantially circular in plan.

16. Apparatus according to claim 13, wherein the refining zone and the slag separation zone are disposed on opposite sides of the melting-smelting zone.

References Cited
UNITED STATES PATENTS

| | | | |
|---|---|---|---|
| 3,463,629 | 8/1969 | Hatch | 75—11 |
| 3,207,596 | 9/1965 | Pinches | 266—11 |
| 3,326,671 | 6/1967 | Worner | 75—40 |
| 3,353,807 | 11/1967 | Sixel | 75—40 |

OTHER REFERENCES

"Electric Smelting of Iron Ore," Foundry Trade Journal, p. 270, October 1941.

"Plasma—A Substitute for the Oxy-Fuel Flame," Welding Journal, p. 870, September 1959.

L. DEWAYNE RUTLEDGE, Primary Examiner

P. D. ROSENBERG, Assistant Examiner

U.S. Cl. X.R.

13—9; 75—11, 40; 266—11